United States Patent
Smith et al.

(10) Patent No.: US 10,883,371 B1
(45) Date of Patent: Jan. 5, 2021

(54) CERAMIC MATRIX COMPOSITE VANE WITH TRAILING EDGE RADIAL COOLING

(71) Applicant: Rolls-Royce plc, London (GB)

(72) Inventors: James C. Smith, London (GB); Emma C. Steedman, London (GB); Michael J. Whittle, London (GB); Edward M. Jones, London (GB)

(73) Assignee: Rolls-Royce plc

( * ) Notice: Subject to any disclaimer, the term of this patent is extended or adjusted under 35 U.S.C. 154(b) by 47 days.

(21) Appl. No.: 16/448,137

(22) Filed: Jun. 21, 2019

(51) Int. Cl.
*F01D 5/18* (2006.01)
*F01D 25/12* (2006.01)

(52) U.S. Cl.
CPC .............. *F01D 5/185* (2013.01); *F01D 25/12* (2013.01); *F05D 2220/32* (2013.01); *F05D 2260/221* (2013.01)

(58) Field of Classification Search
CPC ...... F01D 5/185; F01D 25/12; F05D 2220/32; F05D 2260/221
See application file for complete search history.

(56) References Cited

U.S. PATENT DOCUMENTS

| | | | |
|---|---|---|---|
| 5,813,827 A | 9/1998 | Nordlund et al. | |
| 6,132,169 A | 10/2000 | Manning et al. | |
| 6,514,046 B1 * | 2/2003 | Morrison | F01D 9/02 416/229 A |
| 7,198,458 B2 | 4/2007 | Thompson | |
| 7,527,474 B1 * | 5/2009 | Liang | F01D 5/186 416/1 |
| 7,722,326 B2 | 5/2010 | Beeck et al. | |
| 8,206,098 B2 * | 6/2012 | Prill | F01D 5/284 415/200 |
| 8,210,803 B2 * | 7/2012 | Schaff | F01D 5/147 415/200 |
| 8,251,660 B1 | 8/2012 | Liang | |
| 8,292,580 B2 * | 10/2012 | Schiavo | F01D 5/189 416/96 A |
| 8,523,524 B2 | 9/2013 | Benson et al. | |
| 8,807,944 B2 | 8/2014 | Itzel et al. | |
| 8,979,477 B2 | 3/2015 | Johnson et al. | |
| 9,945,251 B2 | 4/2018 | Yeager et al. | |
| 2016/0290147 A1 * | 10/2016 | Weaver | F01D 25/005 |
| 2017/0211416 A1 | 7/2017 | Weaver et al. | |
| 2018/0045117 A1 * | 2/2018 | Groves, II | F01D 11/24 |
| 2018/0230815 A1 | 8/2018 | Jones | |

* cited by examiner

Primary Examiner — Igor Kershteyn
(74) Attorney, Agent, or Firm — Barnes & Thornburg LLP

(57) ABSTRACT

A component adapted for use in a gas turbine engine includes an aerofoil configured to interact with gases flowing through the gas turbine engine along a gas path. The aerofoil is formed to include a first passage that extends radially at least partway into the aerofoil and a second passage that extends radially into the aerofoil at a trailing edge of the aerofoil.

20 Claims, 4 Drawing Sheets

US 10,883,371 B1

CERAMIC MATRIX COMPOSITE VANE WITH TRAILING EDGE RADIAL COOLING

FIELD OF THE DISCLOSURE

The present disclosure relates generally to components for gas turbine engines, and more specifically to aerofoils that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over aerofoils included in stationary vanes and rotating blades of the turbine. The interaction of combustion products with the aerofoils heats aerofoils to temperatures that require the aerofoils to be made from high-temperature resistant materials and/or to be actively cooled by supplying relatively cool air to the vanes and blades. To this end, some aerofoils for vanes and blades incorporate composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A component for a gas turbine engine includes a ceramic matrix composite aerofoil. The ceramic matrix composite aerofoil is adapted to conduct gases flowing through a gas path of a gas turbine engine around the component during use of the component. The ceramic matrix composite aerofoil includes a leading edge, a trailing edge spaced apart axially from the leading edge relative to an axis, a pressure side that extends between and interconnects the leading edge and the trailing edge, and a suction side that extends between and interconnects the leading edge and the trailing edge. The ceramic matrix composite aerofoil may be formed to define an aerofoil-shaped passage that extends radially at least partway into the ceramic matrix composite aerofoil.

The trailing edge, an aft portion of the pressure side, and an aft portion of the suction side of the ceramic matrix composite aerofoil may define a trailing-edge passage. The trailing-edge passage may extend radially through the ceramic matrix composite aerofoil to conduct cooling fluid radially through the trailing edge of the ceramic matrix composite aerofoil.

In some embodiments, a minimum radius of the trailing-edge passage may be smaller than a minimum radius of an aft end of the aerofoil-shaped passage. In some embodiments, the trailing edge, the aft portion of the pressure side, and the aft portion of the suction side of the ceramic matrix composite aerofoil may be formed without passages that provide fluid communication between the gas path and the trailing-edge passage.

In some embodiments, the trailing-edge passage may extend radially through the entire component. The ceramic matrix composite aerofoil may include an inner surface that forms the trailing-edge passage and the inner surface may be continuous and without holes. In some embodiments, the trailing-edge passage and the aerofoil-shaped passage are the only voids in the ceramic matrix composite aerofoil.

In some embodiments, the component may include a ceramic matrix composite outer platform that defines an outer boundary of the gas path and a ceramic matrix composite inner platform spaced apart radially from the ceramic matrix composite outer platform relative to the axis to define an inner boundary of the gas path. The ceramic matrix composite aerofoil may extend radially between the ceramic matrix composite outer platform and the ceramic matrix composite inner platform. The trailing-edge passage may extend radially entirely through the ceramic matrix composite outer platform and the ceramic matrix composite inner platform.

In some embodiments, the aerofoil-shaped passage extends radially entirely through the ceramic matrix composite outer platform and the inner platform. In some embodiments, the component may include a metallic support strut located in the aero-foil shaped passage of the ceramic matrix composite aerofoil and configured to receive force loads acting on the ceramic matrix composite aerofoil during use of the component.

In some embodiments, the ceramic matrix composite aerofoil includes a core body, a trailing edge filler, and an outer layer. The core body may define the leading edge, a fore portion of the pressure side, and a fore portion of the suction side of the ceramic matrix composite aerofoil. The trailing edge filler may define the trailing edge, the aft portion of the pressure side, and the aft portion of the suction side of the ceramic matrix composite aerofoil. The outer layer may extend around the core body and the trailing edge filler to provide an outermost surface of the ceramic matrix composite aerofoil.

In some embodiments, the trailing edge filler may be made of ceramic matrix composite materials. The trailing edge fill may be formed to define the entire trailing-edge passage.

In some embodiments, the core body and the outer layer may be made of ceramic matrix composite materials. The core body may define the entire aerofoil-shaped passage.

In some embodiments, the core body, the trailing edge filler, and the outer layer may be integrally formed such that the ceramic matrix composite aerofoil is a single, one-piece member.

In some embodiments, the ceramic matrix composite aerofoil may be formed to define a plurality of trailing-edge passages that includes the trailing-edge passage. The plurality of trailing-edge passages may include at least a circular shaped trailing-edge passage and an ellipse shaped trailing-edge passage.

In some embodiments, the trailing-edge passage may be ellipse shaped. In some embodiments, the trailing-edge passage may be generally triangular.

A method according to an aspect of the present disclosure may include a number of steps. The steps may include providing an aerofoil-shaped core preform that is formed to define an aerofoil-shaped passage that extends radially there through, providing a trailing edge filler preform that is formed to define a trailing-edge passage that extends radially there through, infiltrating the aerofoil-shaped core preform and the trailing edge filler preform together to provide a single, unitary ceramic matrix composite aerofoil component having the aerofoil-shaped passage and the trailing-edge passage, and directing a first portion of a cooling fluid radially through the aerofoil-shaped passage and directing a second portion of the cooling fluid radially through the trailing-edge passage.

In some embodiments, the aerofoil-shaped passage may have a minimum radius. The trailing-edge passage may have a minimum radius. The minimum radius of the trailing-edge passage may be smaller than the minimum radius of the aerofoil-shaped passage.

In some embodiments, the method may include directing the second portion of the cooling fluid from an outer chamber located radially outward of the ceramic matrix composite aerofoil component, radially inward through the trailing-edge passage, and into an inner chamber located radially inward of the ceramic matrix composite aerofoil.

In some embodiments, the method may include directing the second portion of the cooling fluid from an inner chamber located radially inward of the ceramic matrix composite aerofoil component, radially outward through the trailing-edge passage, and into an outer chamber located radially outward of the ceramic matrix composite aerofoil.

In some embodiments, the method may include machining an inner surface of the ceramic matrix composite aerofoil component that defines the trailing-edge passage to cause the inner surface to have a surface roughness that provides a desired heat transfer between the second portion of the cooling fluid and the inner surface.

These and other features of the present disclosure will become more apparent from the following description of the illustrative embodiments.

DETAILED DESCRIPTION OF THE DRAWINGS

Figure 1:
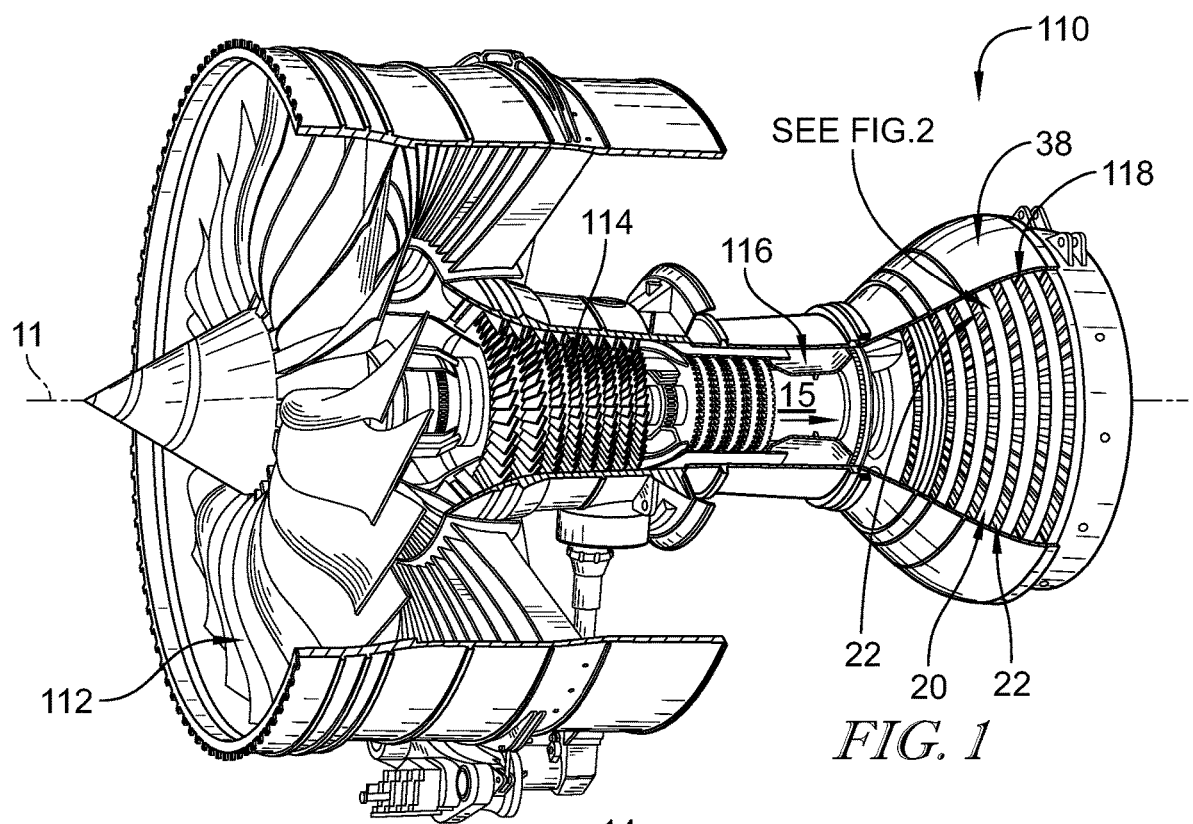
FIG. 1 is a cutaway view of a gas turbine engine that includes a fan, a compressor, a combustor, and a turbine, the turbine including static turbine vane rings configured to direct air into adjacent rotating wheel assemblies.

For the purposes of promoting an understanding of the principles of the disclosure, reference will now be made to a number of illustrative embodiments illustrated in the drawings and specific language will be used to describe the same.

Figure 2:
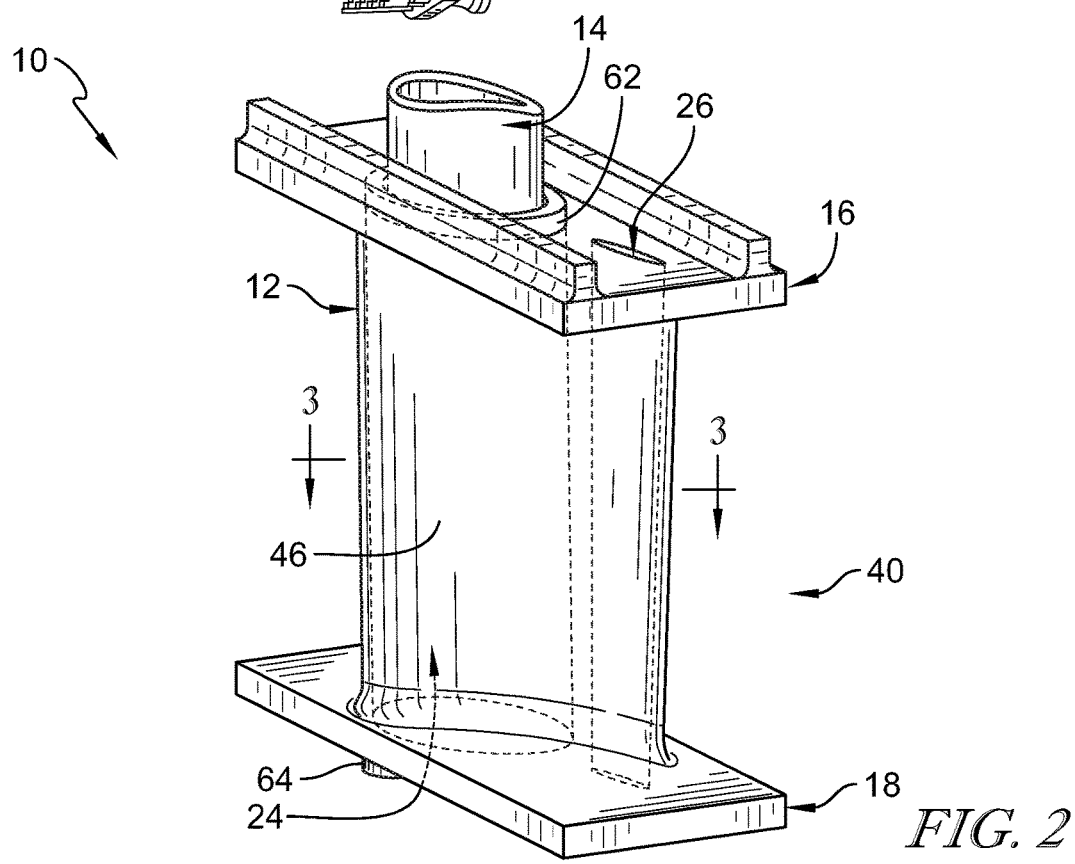
FIG. 2 is a perspective view of a component of the turbine shown in FIG. 1 suggesting that the component includes a ceramic matrix composite aerofoil formed to include an aerofoil-shaped passage and a trailing-edge passage that extends radially through the trailing edge of the ceramic matrix composite aerofoil.

A component 10 for use in a gas turbine engine 110 is shown in FIG. 2. The illustrative component 10 includes a ceramic matrix composite aerofoil 12 as shown in FIGS. 2-5. The ceramic matrix composite aerofoil 12 interacts with hot gases conducted through a gas path 15 of the gas turbine engine 110 and conducts the hot gases around the component 10 toward a rotating wheel assembly 22 located downstream of the component 10. In other embodiments, the component 10 is a blade included in the rotating wheel assembly 22, a seal segment, or other suitable component.

Figure 3:
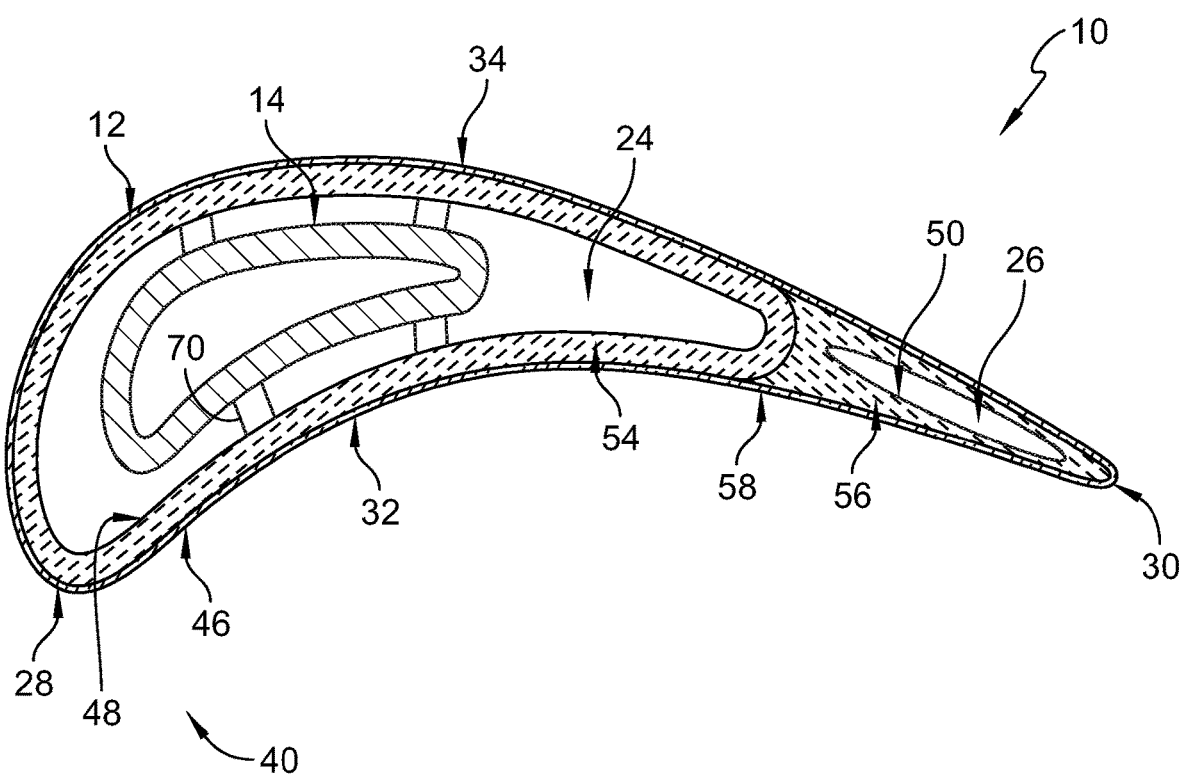
FIG. 3 is a section view taken along line 3-3 of the component of FIG. 2 showing that the component further includes a support strut located in the aerofoil-shaped passage and the ceramic matrix composite aerofoil is made of an aerofoil core, a trailing edge filler formed to define the trailing-edge passage, and an outer layer arranged around the aerofoil core and the trailing edge filler.

The aerofoil 12 is formed to include a passage 24 (sometimes called an internal cavity) and a trailing-edge passage 26 as shown in FIGS. 2 and 3. The passage 24 extends radially at least partway into the aerofoil 12 and, illustratively, extends radially through the aerofoil 12. The trailing-edge passage 26 is located at a trailing edge 30 of the aerofoil 12 and extends radially through the aerofoil 12 to provide cooling to the trailing edge 30. In contrast, some gas turbine engines have aerofoils with trailing edges that are cooled by axially extending cooling holes formed in the aerofoils and the cooling air is expelled to the gas path.

The trailing-edge passage 26 of the present disclosure extends radially through the aerofoil 12 to reduce or remove the design constraints of the aerofoil 12 such as, for example, film air ejection (pressure, Mach no. location, rate) at the trailing edge 30, trailing edge thickness, trailing edge length, and size and position of the passage 24. Illustratively, the trailing-edge passage 26 is formed in a preform separate from the preform that defines the passage 24. The trailing-edge passage 26 is not fluidly connected directly with the passage 24 via other holes or passages. The trailing-edge passage 26 is not fluidly connected with any axially extending holes that are open to the gas path 15.

The component 10 is a vane 40 in the illustrative embodiment and includes a metallic support strut 14, a ceramic matrix composite outer platform 16, and a ceramic matrix composite inner platform 18 as shown in FIG. 2. The metallic support strut 14 extends through the passage 24 of the ceramic matrix composite aerofoil 12 and receives force loads applied to the ceramic matrix composite aerofoil 12 by the hot gases. The outer platform 16 defines an outer boundary of the gas path 15 and the inner platform is spaced apart radially from the outer platform 16 and defines an inner boundary of the gas path 15.

The aerofoil 12 extends radially between and interconnects the outer platform 16 and the inner platform 18 as shown in FIG. 2. The trailing-edge passage 26 extends radially entirely through the outer platform 16 and the inner platform 18 in the illustrative embodiment. Illustratively, the aerofoil-shaped passage 24 extends radially entirely through the outer platform 16 and the inner platform 18. In other embodiments, the component 10 may be a seal segment or a blade configured to be coupled with a disc of one of the rotating wheel assemblies 22.

In some embodiments, the aerofoil 12 comprises ceramic materials and the support strut 14 comprises metallic materials as shown in FIG. 3. In the illustrative embodiment, the aerofoil 12 comprises ceramic matrix composite materials. In other embodiments, each of the aerofoil 12 and support strut 14 may comprise any suitable materials including ceramics, ceramic matrix composites, metals, alloys, super alloys, etc.

The gas turbine engine 110 includes a fan 112, a compressor 114, a combustor 116, and a turbine 118. The fan 112 is driven by the turbine 118 and provides thrust for propelling an aircraft as shown in FIG. 1. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112. In other embodiments, the fan 112 may be omitted and/or the turbine 118 drives a propeller, drive shaft, or other suitable alternative.

The turbine 118 includes a plurality of static turbine vane rings 20 that are fixed relative to the axis 11 and a plurality of rotating wheel assemblies 22 as suggested in FIG. 1. Each turbine vane ring 20 includes a plurality of the vanes 40. The hot gases are conducted through the gas path 15 and interact with the wheel assemblies 22 to rotate the wheel assemblies 22 about the axis 11. The turbine vane rings 20 are positioned to direct the gases toward the wheel assemblies 22 with a desired orientation. In other embodiments, the components 10 may be seal segments or blades included in the wheel assemblies 22.

The component 10 includes the aerofoil 12 as shown in FIG. 3. The aerofoil 12 includes a leading edge 28, a trailing edge 30, a pressure side 32, and a suction side 34 as shown in FIG. 3. The leading edge 28 is located at a foremost position of the aerofoil 12. The trailing edge 30 is spaced apart axially from the leading edge 28 relative to the axis 11. The pressure side 32 extends between and interconnects the leading edge 28 and the trailing edge 30. The suction side extends between and interconnects the leading edge 28 and the trailing edge 30.

Figure 5:
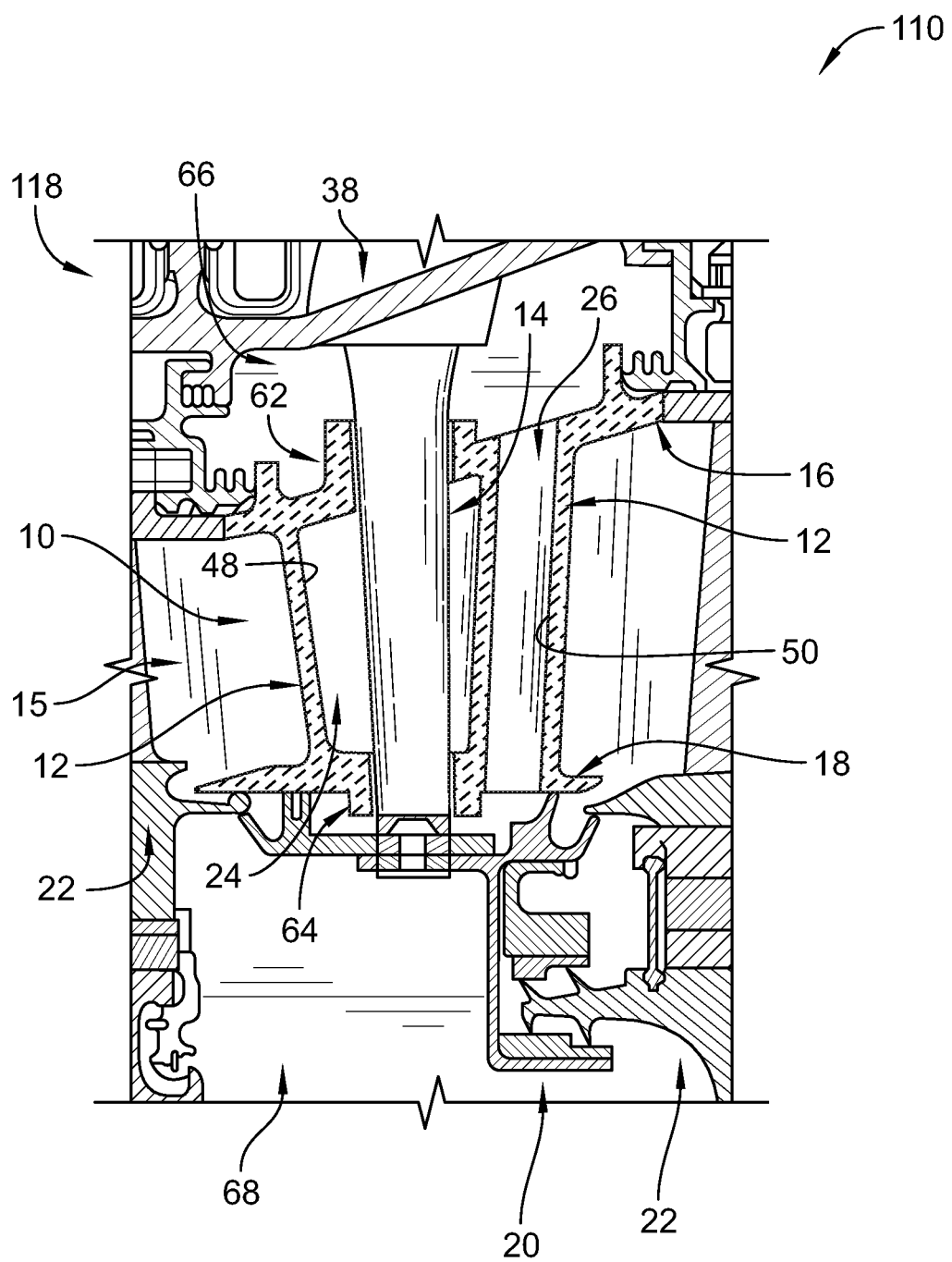
FIG. 5 is a section view of the turbine of the gas turbine engine of FIG. 1 showing the component in the turbine.

The aerofoil 12 is formed to define the passage 24 which is aerofoil shaped in the illustrative embodiment as shown in FIG. 3. The passage 24 extends radially at least partway into the aerofoil 12. Illustratively, the passage 24 extends radially through the entire aerofoil 12, outer platform 16, and inner platform 18 as shown in FIG. 5. Cooling fluid may be directed into the passage 24 during use of the gas turbine engine 110. Illustratively, load pads 70 are located in the passage 24 and engage the aerofoil 12 and the support strut 14 to transmit loads from the aerofoil 12 to the support strut 14.

The aerofoil-shaped passage 24 has a fore end located adjacent the leading edge 28 and an aft end located toward the trailing edge 30. The aft end of the aerofoil-shaped passage 24 is curved and has a minimum radius 42. By forming the radially extending trailing-edge passage 26 at the trailing edge 30, the aft end of the aerofoil-shaped passage 24, including the minimum radius, has design restraints reduced along with a reduction of restraints on the size and shape of the trailing edge 30 and the trailing-edge passage 26.

Figure 4:
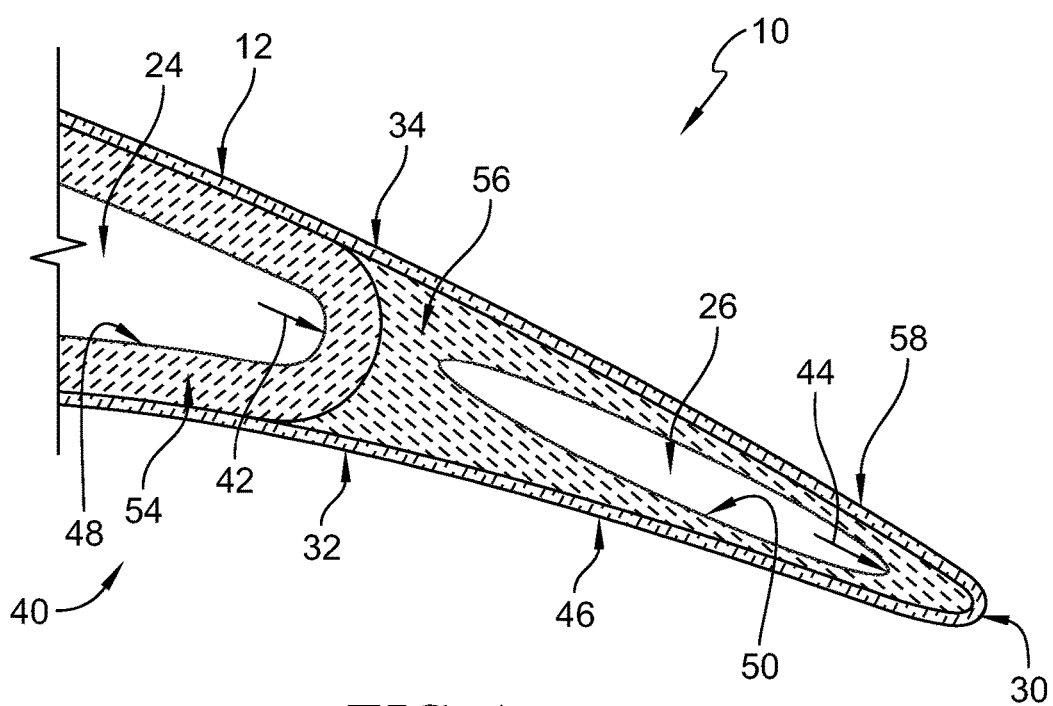
FIG. 4 is an enlarged view of the trailing edge of the component of FIG. 3 showing an aft end of the aerofoil-shaped passage and the trailing-edge passage formed in the component.

The aerofoil 12 if formed to define the trailing-edge passage 26 as shown in FIGS. 3 and 4. The trailing-edge passage 26 extends radially through the entire aerofoil 12 as shown in FIG. 5. Illustratively, the trailing-edge passage 26 extends entirely through the aerofoil 12, the outer platform 16, and the inner platform 18. The trailing-edge passage 26 is curvilinear and has a minimum radius 44. The minimum radius 44 of the trailing-edge passage 26 is less than the minimum radius 42 of the aft end of the passage 24. Forming the trailing-edge passage 26 as a separate passage from the passage 24 allows for the different radii to be used with each passage 24, 26. In the illustrative embodiment, the trailing-edge passage 26 and the aerofoil-shaped passage 24 are the only voids in the aerofoil 12.

Figure 6:
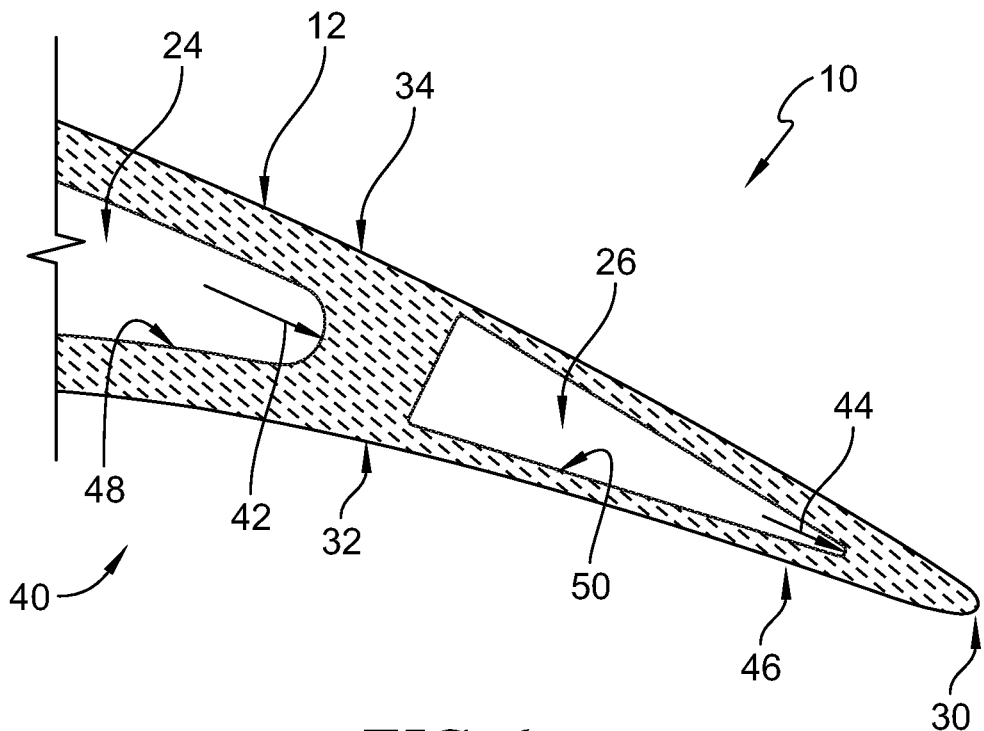
FIG. 6 is a section view of a trailing edge of another embodiment of a ceramic matrix composite aerofoil in accordance with the present disclosure showing that the trailing-edge passage is generally triangular.
Figure 7:
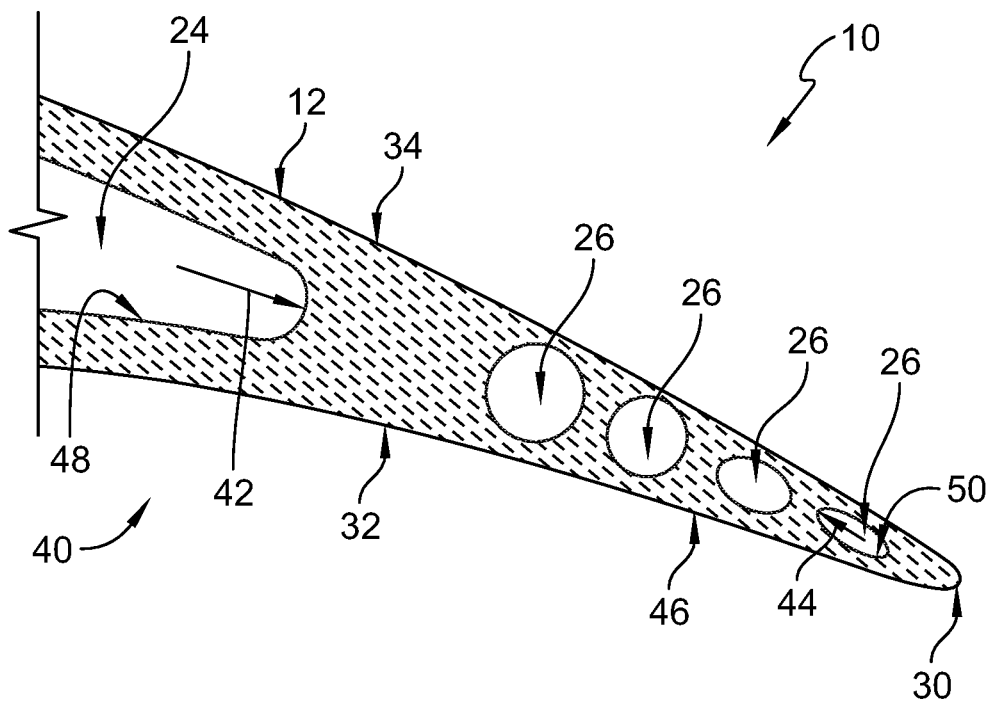
FIG. 7 is a section view of a trailing edge of another embodiment of a ceramic matrix composite aerofoil in accordance with the present disclosure showing that the trailing edge is formed to define a plurality of trailing-edge passages therein.

The trailing-edge passage 26 may be circular, ellipse shaped, oval, triangular, rectangular, eccentric, uniquely shaped, or any other suitable alternative. In some embodiments, the trailing-edge passage 26 is ellipse shaped as shown in FIG. 4. In other embodiments, the trailing-edge passage 26 is generally triangular as shown in FIG. 6. In some embodiments, the trailing-edge passage 26 is circular as shown in FIG. 7. In some embodiments, the aerofoil 12 is formed to define a plurality of trailing-edge passages 26 as shown in FIG. 7.

The aerofoil 12 includes an outer surface 46, an inner surface 48, and an inner surface 50 as shown in FIG. 3. The outer surface 46 is an outermost surface of the aerofoil 12 and defines a portion of the gas path 15 and is exposed to gases in the gas path 15 during use of the gas turbine engine 110. The inner surface 48 defines the aerofoil-shaped passage 24. The inner surface 50 defines the trailing-edge passage 26.

The inner surface 50 is continuous in the illustrative embodiment as shown in FIGS. 4 and 5. The inner surface 50 is formed without holes or other passages. For example, unlike some aerofoils, the inner surface 50 is not formed with axially extending passages that fluidly connect the trailing-edge passage 26 with the gas path 15 or with the passage 24. The inner surface 50 may be machined, formed, and/or textured in some embodiments to obtain a desired heat transfer coefficient to transfer heat from the aerofoil 12 to the cooling fluid directed through the trailing-edge passage 26.

The aerofoil 12 includes a core body 54, a trailing edge filler 56, and an outer layer 58 as shown in FIG. 3. Illustratively, the core body 54, the trailing edge filler 56, and the outer layer 58 are infiltrated together and integrally formed such that the ceramic matrix composite aerofoil 12 is a single, one-piece member. In other embodiments, the aerofoil 12 is formed from one preform as shown in FIGS. 6 and 7. The core body 54 is made using a core body preform, the trailing edge filler 56 is made using a trailing edge filler preform, and the outer layer 58 is made using an outer layer preform. The preforms are infiltrated together to provide the core body 54, the trailing edge filler 56, and the outer layer 58.

The core body 54 defines the leading edge 28, a fore portion of the pressure side 32, and a fore portion of the suction side 34 of the aerofoil 12. The trailing edge filler 56 defines the trailing edge 30, an aft portion of the pressure side 32, and an aft portion of the suction side 34 of the aerofoil 12. The outer layer 58 extends around the core body 54 and the trailing edge filler 56 to provide an outermost surface 46 of the aerofoil 12.

The trailing edge filler 56 is made of ceramic matrix composite materials in the illustrative embodiment and is formed to define the entire trailing-edge passage 26 as shown in FIG. 4. Forming the trailing-edge passage 26 in the trailing edge filler 56 and forming the trailing edge filler 56 separate from the core body 54 using the preforms may reduce design constraints on the core body 54, the trailing-edge passage 26, and/or the passage 24. The core body 54 and the outer layer 58 are made of ceramic matrix composite materials and the core body 54 defines the entire aerofoil-shaped passage 24 in the illustrative embodiment.

Each passage 24, 26 may be formed in the preform and then set during infiltration. Each passage 24, 26 may also be formed after the preforms are infiltrated as solid members and then machined into the solid members.

In the illustrative embodiment, the outer platform 16, the inner platform 18, and the aerofoil 12 are integrally formed from ceramic matrix composite materials. As such, the outer platform 16, the inner platform 18, and the aerofoil 12 provide a single, integral, one-piece vane 40 as shown in FIG. 2. In other embodiments, the outer platform 16, the inner platform 18, and the aerofoil 12 may be formed as separate components.

In the illustrative embodiment, the component 10 is formed to include an outer brim 62 that extends radially outward from the outer platform 16 and an inner brim 64 that extends radially inward from the inner platform 18 as shown in FIG. 5. The component 10 is located in the turbine 118 of the gas turbine engine 110 and defines a portion of an outer chamber 66 located radially outward of the component 10 and a portion of an inner chamber 68 located radially inward of the component 10. Cooling air may be provided to one or both of the outer chamber 66 and the inner chamber 68. Cooling air is directed radially through the trailing-edge passage 26 from one of the outer chamber 66 and the inner chamber 68 to the other of the outer chamber 66 and the inner chamber 68.

The ceramic matrix composite aerofoil 12 is adapted to withstand high temperatures, but may have relatively low strength compared to the metallic support strut 14. The support strut 14 provides structural strength to the aerofoil 12 by receiving the force loads applied to the aerofoil 12 and transferring them to a casing that surrounds the component 10. The support strut 14 may not be capable of withstanding directly the high temperatures experienced by the aerofoil 12.

The support strut 14 is engaged, directly or indirectly via load pads 70, seals, etc., with the aerofoil 12 to receive force loads from the aerofoil 12 and transfer them to a casing 38 of the engine 110 that is arranged around the turbine 118 as suggested in FIG. 5. The support strut 14 is located in the passage 24 and extends radially through the outer platform 16, the inner platform 18, and the aerofoil 12 as shown in FIG. 5.

A first end of the support strut 14 is coupled to the casing 38 arranged around the component 10. The second end of the support strut 14 is cantilevered from the casing 38 in the illustrative embodiment. The support strut 14 is hollow in the illustrative embodiment. In some embodiments, the support strut 14 includes holes that extend through the support strut 14 to allow cooling air to pass through the hollow support strut 14 and flow into the passage 24. In other embodiments, the support strut 14 is solid.

A method in accordance with the present disclosure includes a number of steps. The method may include providing the aerofoil-shaped core preform and the trailing edge preform. The aerofoil-shaped core is formed to define the aerofoil-shaped passage 24 that extends radially there through. The trailing edge filler preform is formed to define the trailing-edge passage 26 that extends radially there through. The method includes infiltrating the aerofoil-shaped core preform and the trailing edge filler preform together to provide a single, unitary ceramic matrix composite aerofoil component 12 having the aerofoil-shaped passage 24 and the trailing-edge passage 26. The method may include directing a first portion of cooling fluid radially through the aerofoil-shaped passage 24 and directing a second portion of the cooling fluid radially through the trailing-edge passage 26.

The aerofoil-shaped passage 24 has a minimum radius and the trailing-edge passage 26 has a minimum radius. The minimum radius of the trailing-edge passage 26 is smaller than the minimum radius of the aerofoil-shaped passage 24 in some embodiments. The method may include machining the inner surface 50 of the ceramic matrix composite aerofoil 12 that defines the trailing-edge passage 26 to cause the inner surface 50 to have a surface roughness that provides a desired heat transfer between the second portion of the cooling fluid and the inner surface 50.

The method may include directing the second portion of the cooling fluid from the outer chamber 66 located radially outward of the ceramic matrix composite aerofoil 12, radially inward through the trailing-edge passage 26, and into the inner chamber 68 located radially inward of the ceramic matrix composite aerofoil 12. The method may include directing the second portion of the cooling fluid from the inner chamber 68 located radially inward of the ceramic matrix composite aerofoil 12, radially outward through the trailing-edge passage 26, and into the outer chamber 66 located radially outward of the ceramic matrix composite aerofoil 12.

The hottest part of a ceramic matrix composite vane 40 or other aerofoil may be at the trailing edge 30. In some gas turbine engines, the trailing edge of an aerofoil may be cooled by axial cooling holes formed in the aerofoil where the cooling air is expelled to the gas path. This may provide design constraints associated with: film ejection (pressure, Mach No. location and rate), trailing edge thickness, trailing edge length, and position of the internal cavity (aerofoil-shaped passage 24).

The present disclosure provides aerofoils 12 with cooling holes 26 in the radial direction. In illustrative embodiments, the cooling air is not being expelled directly to the gas path 15. As such, the present disclosure may allow for a relaxation or removal in the design constraints such as film ejection (pressure, Mach no. location, rate), trailing edge thickness, trailing edge length and position of the internal cavity 24.

Some high pressure stage two turbine nozzle guide vanes 40 are made from metallic super-alloys which may be easier to manufacture into a desired shape than ceramic matrix composite vanes. As such, the metallic vanes may not have the same issues with design constraints as compared to ceramic matrix composite vanes. Typical ceramic matrix composite cooling holes connect the internal passage with the aerofoil pressure side as per nozzle guide vane convention.

Ceramic matrix composite components may feature excellent properties when subjected to high temperatures compared to the conventional materials of choice for gas turbine engines such as Nickel based super alloys. The benefit of ceramic matrix composite components may allow for a reduction in cooling air flow to be used to cool the components, resulting in an increase in thermal efficiency and, thus, improving specific fuel capacity of the gas turbine engine.

The present disclosure details how the cooling scheme at the trailing edge 30 could be made to flow in a radial direction to allow a relaxation of design constraints. This could also allow the cooling air to further be used for sealing purposes. The present disclosure provides methods and features for cooling the trailing edge 30 of the ceramic matrix composite (CMC) aerofoils 12 such as vanes 40 and blades. This involves conducting the direction of the cooling air in a radial direction instead of axially which may remove or relax design constraints associated with the trailing edge 30 of said aerofoils.

The region of the gas turbine engine 110 that may be hot enough to warrant the use of ceramic matrix composite materials and not too hot to overheat the materials is the high pressure stage two (HP2) of the turbines 118. The materials may be used in blades, seal segments, and nozzle guide vanes (NGVs).

Examples of shapes of the radial hole(s) to provide cooling to the trailing edge 30 are shown in FIGS. 4, 6, and 7. The surface roughness of the surface 50 defining the cooling hole(s) are altered in some embodiments to obtain a suitable heat transfer coefficient. Changes to the surface roughness in the trailing edge cavity 26 may allow for an altered heat transfer coefficient. The radial cooling flow could go from either outer to inner radius or inner to outer radius, depending on engine architecture.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A component for a gas turbine engine, the component comprising:

a ceramic matrix composite aerofoil adapted to conduct gases flowing through a gas path of the gas turbine engine around the component during use of the component, the ceramic matrix composite aerofoil having a leading edge, a trailing edge spaced apart axially from the leading edge relative to an axis, a pressure side that extends between and interconnects the leading edge and the trailing edge, and a suction side that extends between and interconnects the leading edge and the trailing edge, the ceramic matrix composite aerofoil formed to define an aerofoil-shaped passage that extends radially at least partway into the ceramic matrix composite aerofoil, and the trailing edge, an aft portion of the pressure side, and an aft portion of the suction side of the ceramic matrix composite aerofoil define a trailing-edge passage that extends radially through the ceramic matrix composite aerofoil to conduct cooling fluid radially through the trailing edge of the ceramic matrix composite aerofoil.

2. The component of claim 1, wherein a minimum radius of the trailing-edge passage is smaller than a minimum radius of an aft end of the aerofoil-shaped passage.

3. The component of claim 1, wherein the trailing edge, the aft portion of the pressure side, and the aft portion of the suction side of the ceramic matrix composite aerofoil are formed without passages that provide fluid communication between the gas path and the trailing-edge passage.

4. The component of claim 1, wherein the trailing-edge passage extends radially through the entire component, the ceramic matrix composite aerofoil includes an inner surface that forms the trailing-edge passage, and the inner surface is continuous and without holes.

5. The component of claim 1, wherein the trailing-edge passage and the aerofoil-shaped passage are the only voids in the ceramic matrix composite aerofoil.

6. The component of claim 1, further comprising a ceramic matrix composite outer platform that defines an outer boundary of the gas path and a ceramic matrix composite inner platform spaced apart radially from the ceramic matrix composite outer platform relative to the axis to define an inner boundary of the gas path, the ceramic matrix composite aerofoil extends radially between the ceramic matrix composite outer platform and the ceramic matrix composite inner platform, and the trailing-edge passage extends radially entirely through the ceramic matrix composite outer platform and the ceramic matrix composite inner platform.

7. The component of claim 6, wherein the aerofoil-shaped passage extends radially entirely through the ceramic matrix composite outer platform and the inner platform.

8. The component of claim 6, further comprising a metallic support strut located in the aero-foil shaped passage of the ceramic matrix composite aerofoil and configured to receive force loads acting on the ceramic matrix composite aerofoil during use of the component.

9. The component of claim 1, wherein the ceramic matrix composite aerofoil includes a core body, a trailing edge filler, and an outer layer, the core body defines the leading edge, a fore portion of the pressure side, and a fore portion of the suction side of the ceramic matrix composite aerofoil, the trailing edge filler defines the trailing edge, the aft portion of the pressure side, and the aft portion of the suction side of the ceramic matrix composite aerofoil, and the outer layer extends around the core body and the trailing edge filler to provide an outermost surface of the ceramic matrix composite aerofoil.

10. The component of claim 9, wherein the trailing edge filler is made of ceramic matrix composite materials and is formed to define the entire trailing-edge passage.

11. The component of claim 10, wherein the core body and the outer layer are made of ceramic matrix composite materials and the core body defines the entire aerofoil-shaped passage.

12. The component of claim 9, wherein the core body, the trailing edge filler, and the outer layer are integrally formed such that the ceramic matrix composite aerofoil is a single, one-piece member.

13. The component of claim 12, wherein the ceramic matrix composite aerofoil is formed to define a plurality of trailing-edge passages that includes the trailing-edge passage, the plurality of trailing-edge passages includes at least a circular shaped trailing-edge passage and an ellipse shaped trailing-edge passage.

14. The component of claim 12, wherein the trailing-edge passage is ellipse shaped.

15. The component of claim 12, wherein the trailing-edge passage is generally triangular.

16. A method comprising providing an aerofoil-shaped core preform that is formed to define an aerofoil-shaped passage that extends radially there through, providing a trailing edge filler preform that is formed to define a trailing-edge passage that extends radially there through, infiltrating the aerofoil-shaped core preform and the trailing edge filler preform together to provide a single, unitary ceramic matrix composite aerofoil component having the aerofoil-shaped passage and the trailing-edge passage, and directing a first portion of a cooling fluid radially through the aerofoil-shaped passage and directing a second portion of the cooling fluid radially through the trailing-edge passage.

17. The method of claim 16, wherein the aerofoil-shaped passage has a minimum radius, the trailing-edge passage has a minimum radius, and the minimum radius of the trailing-edge passage is smaller than the minimum radius of the aerofoil-shaped passage.

18. The method of claim 16, further comprising directing the second portion of the cooling fluid from an outer chamber located radially outward of the ceramic matrix composite aerofoil component, radially inward through the trailing-edge passage, and into an inner chamber located radially inward of the ceramic matrix composite aerofoil.

19. The method of claim 16, further comprising directing the second portion of the cooling fluid from an inner chamber located radially inward of the ceramic matrix composite aerofoil component, radially outward through the trailing-edge passage, and into an outer chamber located radially outward of the ceramic matrix composite aerofoil.

20. The method of claim 16, further comprising machining an inner surface of the ceramic matrix composite aerofoil component that defines the trailing-edge passage to cause the inner surface to have a surface roughness that provides a desired heat transfer between the second portion of the cooling fluid and the inner surface.

* * * * *